June 22, 1926.

W. FRENSDORFF ET AL

SHIP STEERING MECHANISM

Filed May 1, 1925 4 Sheets-Sheet 1

1,589,382

Inventors:
Willy Frensdorff
and Hermann Hein
By *[signature]* Attorn*

June 22, 1926.　　　W. FRENSDORFF ET AL　　　1,589,382
SHIP STEERING MECHANISM
Filed May 1, 1925　　4 Sheets-Sheet 2
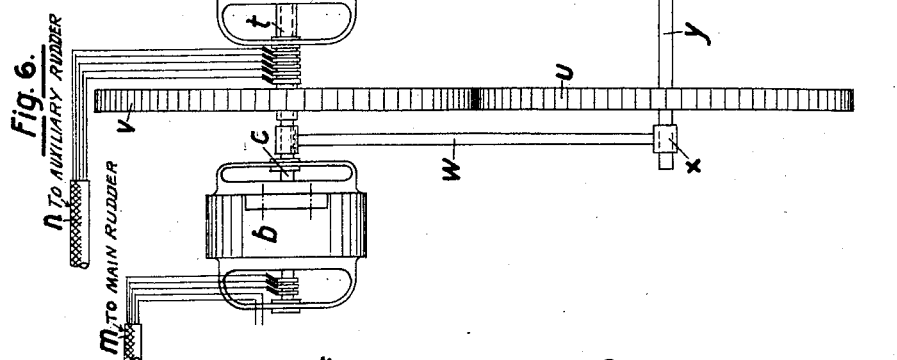
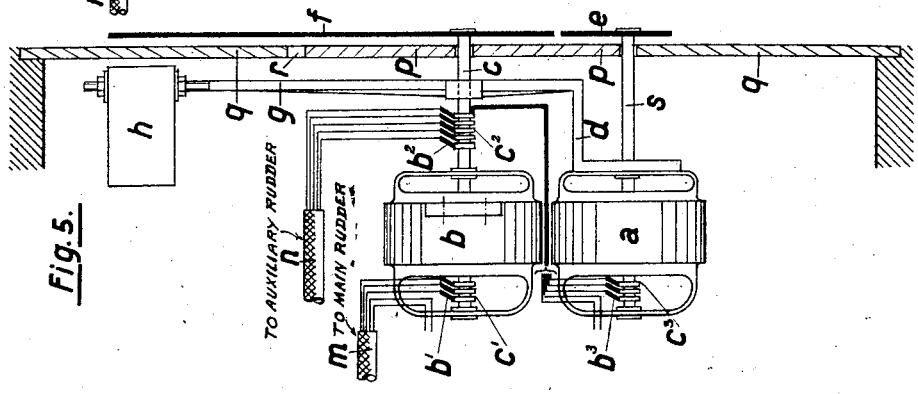
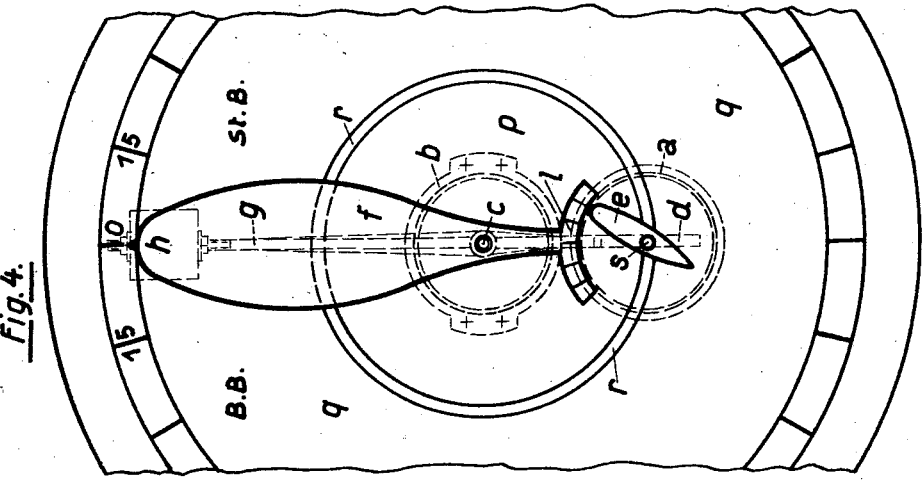
Inventors:
Willy Frensdorff
and Hermann Hein June 22, 1926.
W. FRENSDORFF ET AL
1,589,382
SHIP STEERING MECHANISM
Filed May 1, 1925
4 Sheets-Sheet 3
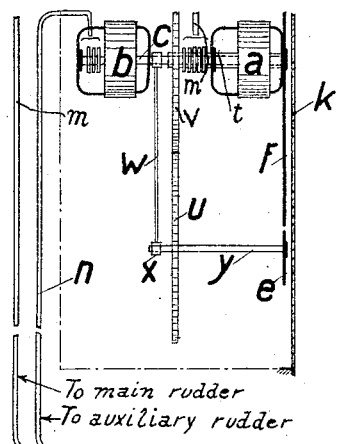
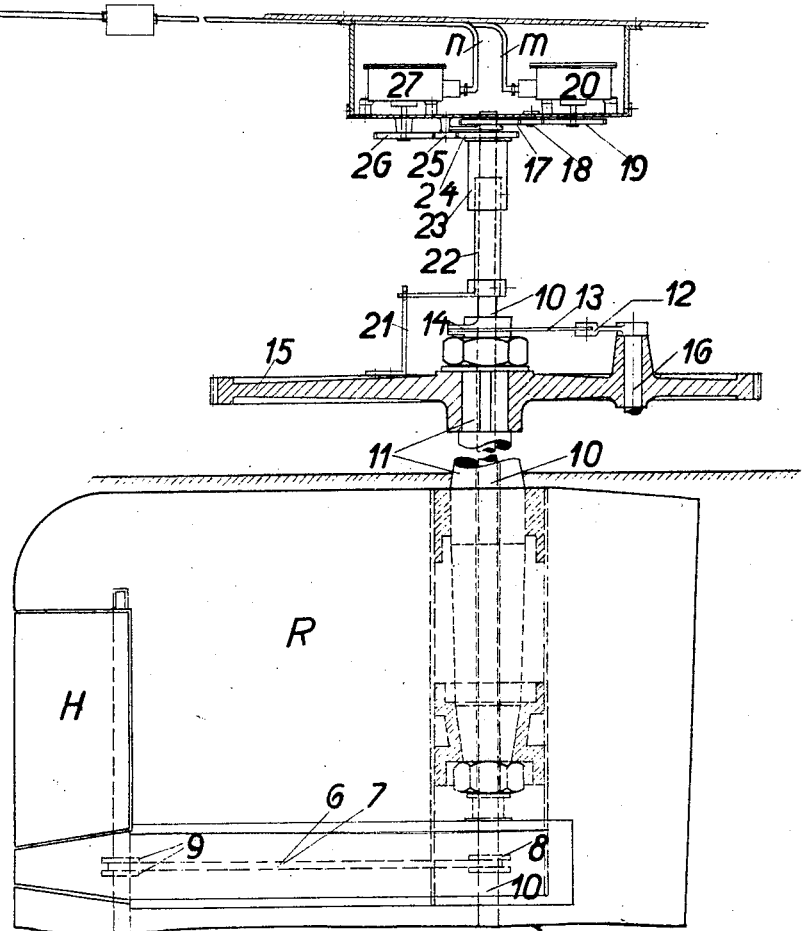
Fig. 7.
Inventors:
W. Frensdorff & H. Hein
by Emil Bonnelycke
Attorney Patented June 22, 1926.

1,589,382

UNITED STATES PATENT OFFICE.

WILLY FRENSDORFF AND HERMANN HEIN, OF BREMEN, GERMANY, ASSIGNORS TO ACTIEN-GESELLSCHAFT "WESER," OF BREMEN, GERMANY, A CORPORATION OF GERMANY.

SHIP-STEERING MECHANISM.

Application filed May 1, 1925, Serial No. 27,306, and in Germany April 5, 1924.

This invention relates to ship steering mechanism, and particularly to indicator instruments designed to show the positions of the rudders at all times. It involves an improvement in such indicators for use with so-called steam-operated rudders consisting of a main and an auxiliary rudder, as shown for example in Patent No. 1,382,170, granted June 21, 1921, to Francisco Conti.

Heretofore, a separate indicator has been used for each of these rudders, thus requiring the constant observation of two independent instruments and necessitating close attention which is inconvenient, since at each moment, the constantly-varying positions of the two rudders are represented at two separated points of observation, from which the positions must be correctly interpreted for proper navigation.

Material simplification of observation and consequent greater security of navigation are attained by means of this invention, by combining in one instrument the indicator for both the main and auxiliary rudders, so that but one point of observation has to be watched. The instrument is so constructed that the relative positions of the pointers give an image of the positions of the rudders in plan view, the indicator for the auxiliary rudder being controlled in its movements by those of the indicator for the main rudder. The navigator, therefore, obtains at a glance an exact, compact picture of the rudder positions and of the relative effects of the main and auxiliary rudders.

In the accompanying drawings,

Figs. 1-6 show diagrammatically four embodiments of the invention, Figs. 1 and 4 being front views of the indicators and Figs. 2, 3 and 5 corresponding longitudinal sections of the indicator mechanism.

In the form of Figs. 1-5, the repeater motor for actuating the auxiliary rudder indicator, swings about the pivot pin of the main rudder indicator.

Fig. 6 shows in longitudinal section an embodiment in which the repeater motors of the two indicators swing about different axes.

Fig. 7 is a view showing schematically the rudders, the transmitters controlled by the rudders, and the connections between the transmitters and the repeater motors.

Figure 1:
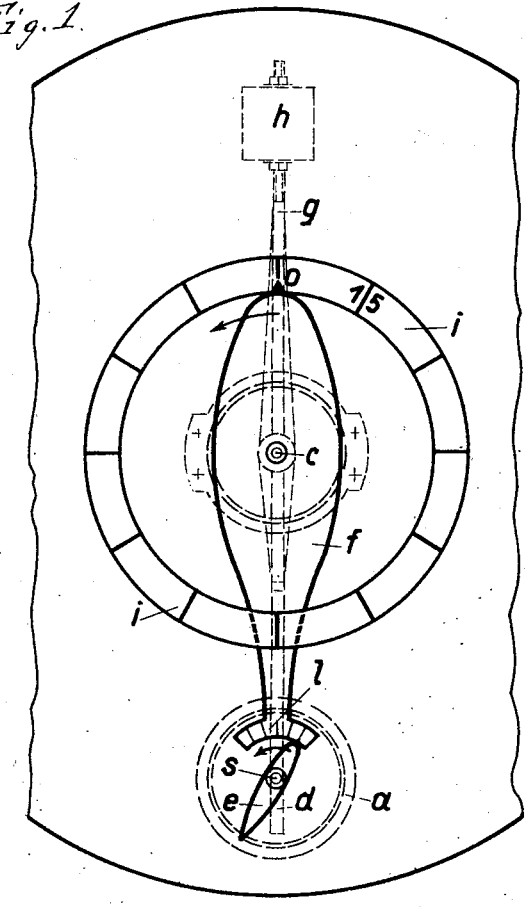
Figure 2:
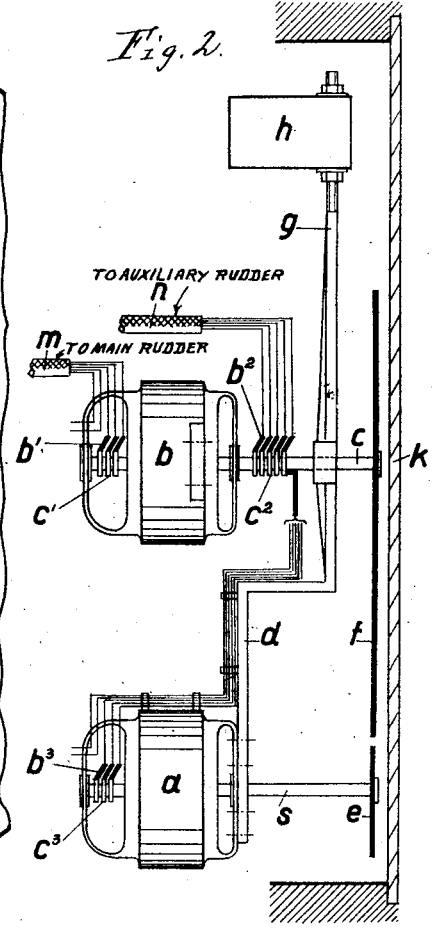

In Figs. 1 and 2, which represent an instrument for vertical installation, the repeater motor $a$ of the auxiliary rudder indicator is so connected to the motor $b$ of the main rudder indicator, by means of an arm $d$ fast on the shaft $c$ of the main motor, that the pointers $e$, $f$ of the two devices, take opposed positions; that is to say, when one moves to the left, the other moves to the right, which gives a true picture of the rudder positions in plan view. Since the auxiliary motor $a$, in consequence of its rigid connection with the shaft $c$ of the main motor $b$, takes part in any movement of the latter, the pointers $e$, $f$ remain constantly in operative connection, and are moved proportionally in opposite directions by the repeater motors. The steersman, therefore, can always see at a glance a true image of the actual rudder positions and their opposed effects. To balance the weight of the parts $a$, $d$ and to relieve shaft $c$ of load, an arm $g$ equipped with a counter-weight $h$ is provided. The scale $i$ for the main rudder pointer $f$ is mounted on a dull-colored disk $k$, covering the entire mechanism, while the scale $l$ for the auxiliary rudder pointer $e$ is carried on the tail end of the main pointer $f$. Pointers $e$ and $f$, and scale $l$ are painted in dark colors, in order to render them visible through the disk $k$. The surfaces of the other parts facing the disk receive a coating corresponding in color to that of the disk.

The repeater motors of both indicators are protected, as usual, against external influences, and are of known construction. They receive their energy through brushes and rings, which latter, for the motor $b$, are on the shaft $c$ thereof, and, for the motor $a$ on the shaft $s$ thereof. From each set of brushes a five-ply cable leads to the pointers. The cable $m$ leads to brushes $b'$ which engage three rings $c'$ for the armature of motor $b$, and the other two conductors lead to the magnet field. The cable $n$ leads to brushes $b^2$ engaging five rings $c^2$ also on the shaft $c$, from which rings $c^2$ three conductors lead to brushes $b^3$ which engage three rings $c^3$ on the shaft $s$ of motor $a$, the other two conductors leading to the magnet field of said motor.

Figure 3:
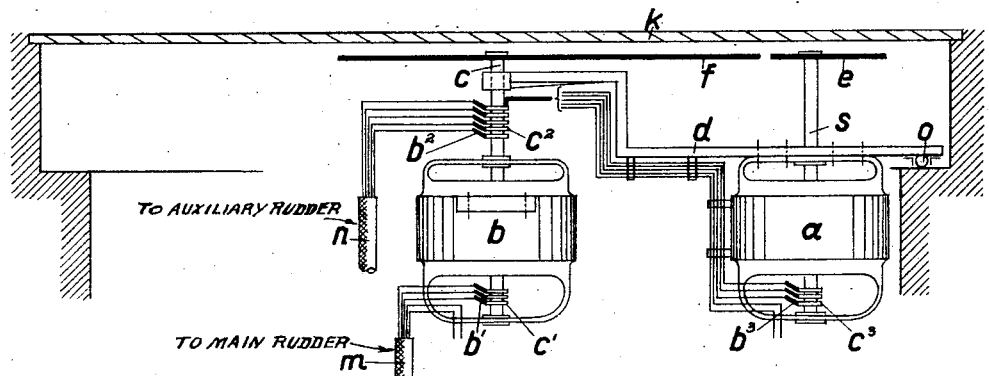

Fig. 3 shows the same mechanism in horizontal disposition. In this case, the parts $a$ and $d$ are counterbalanced by being supported and guided with rolling friction on a supporting surface. For example, the arm $d$, connected with the auxiliary pointer $e$, can be guided by means of balls $o$ upon a suitable supporting surface in the casing. In this arrangement, the shaft $c$ of the main pointer $f$ is relieved of all weight of the parts $a$, $d$, so that the directing force of its motor has only to overcome frictional resistance. Otherwise this form is the same as that of Fig. 1.

Figs. 4 and 5 show a form of the invention in which the pointers are visible from outside. To this end, the outer covering disk, which carries the scale for the main pointer, is made in two parts, an inner circular disk $p$ and an outer annular disk or ring $q$. These disks form between them an annular slot $r$ through which the supporting spindle $s$ of motor $a$ for the auxiliary pointer passes, and in which it is guided during its movement about the shaft $c$ of the main motor $b$. Shaft $c$ is fast with the disk $p$, which accordingly turns with the pointer $f$ of the main motor $b$. In this arrangement, the pointers receive longer movements than correspond to the actual rudder positions. But, if desired, a close approximation to the true rudder movements can be obtained by moving the scale $i$ for the large pointer $f$ to the inner edge of the disk $q$, and extending the scale $l$ on the end of the large pointer and with which the small pointer $e$, coacts to the slot $r$, with a corresponding shortening of the small pointer.

The construction shown in Figs. 4 and 5 otherwise corresponds to that of Figs. 1 and 2, and is designed for vertical disposition, but it can, like that of Fig. 3, be arranged horizontally.

The modification of Fig. 6 consists in the fact that the auxiliary motor $a$, as well as the main motor $b$, swings only about its own axis, and is so connected with its pointer $e$ and the main motor through a transmission, that a relative displacement of the auxiliary pointer $e$ only takes place when the auxiliary motor is operated. By this arrangement, the rotation of the auxiliary motor and associated parts required in the above described embodiments of the invention about the axis of the main motor is avoided, as well as a consequent increase in the power of the motor, or a stoppage of the latter. In this form, the frame of the main motor $b$ is rigidly connected with the casing enclosing the whole mechanism, so that said frame is always stationary. On the armature shaft $c$ of this motor, which carries the main pointer $f$, is mounted also the auxiliary motor $a$. The frame of this motor is rigidly connected with the pointer $f$. The armature of the auxiliary motor is loosely mounted on the shaft $c$ by means of a hollow shaft or sleeve $t$. Shaft $t$ is connected to the shaft $y$ of the auxiliary pointer $e$ by two large gears $v$, $u$, of equal size. The pointers $e$, $f$, have exactly the same opposed arrangement as in the embodiments first described. Shaft $y$ and its gear $u$ are supported in a bearing $x$, which is rigidly connected with the shaft $c$ of the main motor $b$ by a rod or arm $w$.

The operation is as follows: The rotation of the armature of the main motor $b$ causes the magnet frame and the armature of the auxiliary motor $a$ to turn in the same direction and at the same speed. With the shaft $c$ turn also, at the same angular velocity, the gear $v$ and the arm $w$, the latter at the same time swinging the gear $u$ around the shaft $c$. Consequently, there is no relative movement between the gears $v$ and $u$. The result is to move the auxiliary pointer $e$ in accordance with the displacement of the pointer $f$, but at the same time to prevent the shaft $y$ from imparting a separate rotation to the said pointer and thereby giving it a position which does not correspond to the actual rudder position. On the other hand, when the auxiliary pointer $e$ is actuated, it imparts a relative motion to the shafts $c$ and $y$, through the transmission $v$, $u$, so that the pointer $e$ correctly indicates the position of the auxiliary rudder.

Figure 8:
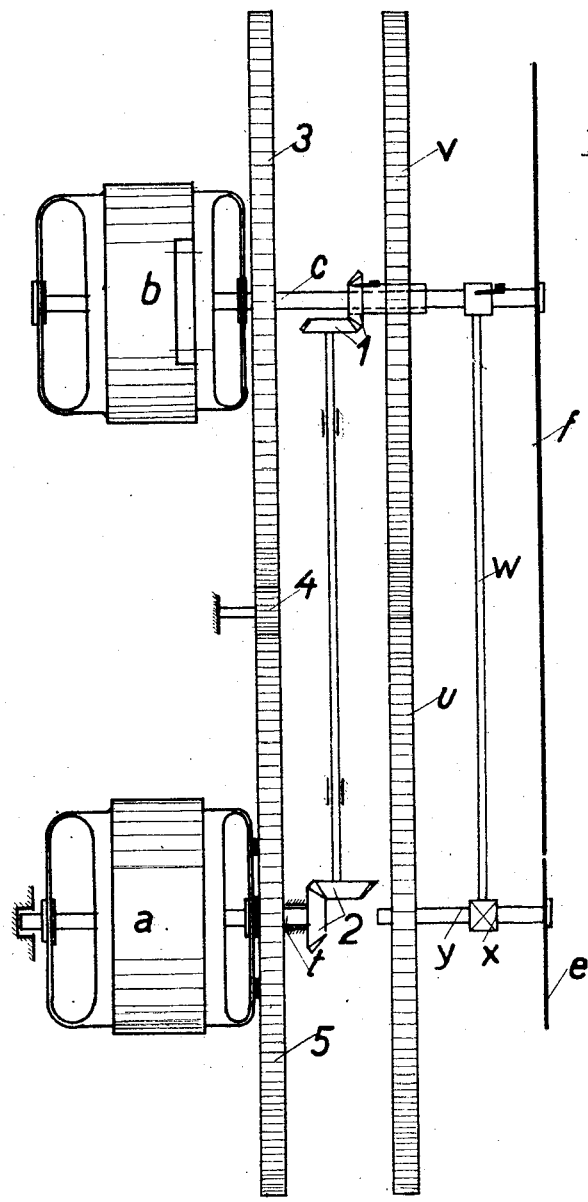
Fig. 8 is a side elevation, showing a modification of the arrangement represented in Fig. 6, in which the repeater motors are mounted on separate parallel shafts.

The coaxial arrangement of the two motors $a$ and $b$, represented in Fig. 6, is not essential for the required operation. The motors can also, in this form, be mounted on separate, for example parallel, shafts and be so operatively connected by intermediate gearing, similar to a differential, that the described method of operation of the indicator mechanism is obtained. An arrangement of this character is illustrated in Fig. 8, in which the shafts $t$ and $c$ of the motors $a$ and $b$ are arranged separately in parallel. The frame of the main motor $b$ is fixedly mounted, while the frame of the auxiliary motor $a$ and the shaft $c$, as explained below, are rotatable. The said shaft $c$, as well as the rod $w$, is connected with the auxiliary shaft $y$ which carries the auxiliary pointer $e$, just as in the embodiment according to Fig. 6, by means of gears $u$, $v$, which rod $w$ carries a bearing $x$ for the shaft $y$ of gear $u$. The gear $v$ is loose on shaft $c$ and is connected by double bevel gearing 1, 2 with the shaft $t$ of the motor $a$. Gearing 3, 4 and 5 is also interposed between the shafts $t$ and $c$, the gear 3 being fixed on the shaft c, while the gear 5 is freely rotatable on the shaft t, although rigidly connected to the frame of the motor a; the gears 3 and 5 turning in the same direction and at the same speed.

In operation, when the motor b of the main pointer receives a right-hand current, the shaft y which carries the auxiliary pointer e swings in the same direction as the main pointer f about the shaft c, by means of the connection between the shafts c, y and the gearing u, v, whereof only the gear v rotates. Due to the rotation of this gear v, the beveled gearing 1, 2 is simultaneously driven, and by this means the shaft t of the auxiliary motor a is turned in the same direction as the shaft c. The frame of the auxiliary motor a causes this rotation to take place in the same direction as the gears 3 and 5; and since the auxiliary pointer e is mounted on shaft y which is not influenced by these rotations, no relative movement of the pointers occurs. Should the auxiliary motor a receive a right-hand current, which would produce rotation of the shaft t, the gear v loose on shaft c, which is then removed from gear u, is turned through the beveled gearing 1, 2. Hence, the shaft y, and with it the auxiliary pointer e, is adjusted.

Fig. 7 shows, in a schematic manner, the invention connected with the rudder mechanism, the latter consisting of the main rudder R and the auxiliary rudder H. The auxiliary rudder H is arbitrarily adjusted during steering, in accordance with the steering conditions, by means of the so-called axiometric connection corresponding to the ship movements at the time desired, through an intermediate drive of known kind which operates independently of the main rudder shaft 11 and which is not illustrated for the sake of clearness. This intermediate drive operates by means of a freely-rotatable pin 16 in the rudder quadrant 15, and links 12, 13, 14 on the auxiliary rudder shaft 10, which latter is connected by a link system 6, 7, 8, 9 with the auxiliary rudder H. Each adjustment made in this manner on the shaft 10 or the auxiliary rudder H produces an adjustment automatically of the main rudder R in the same direction, depending upon the hydro-dynamic effects, the hollow shaft 11 of the main rudder R turning freely about the shaft 10 of the auxiliary rudder. Furthermore, the auxiliary rudder turns back automatically to its normal angular position from the same hydro-dynamic effects produced by adjusting the main rudder.

The adjustments of the auxiliary rudder H or of the shaft 10 are transmitted in the same direction to an electromagnetic transmitter 20 by a gear drive 17, 18, 19; said transmitter 20 operating the auxiliary repeater motor a in the same direction, by means of the cable m, whereby the auxiliary pointer e is adjusted in the direction of the adjustment of the auxiliary rudder H. The shaft 11 of the main rudder R is connected by an angle member 21 with the rudder quadrant 15 which moves in the adjustments of the main rudder; and by means of this angle member 21 the adjustments of the main rudder are transmitted to the sleeves or hollow shafts 22, 23 loosely mounted on the auxiliary rudder shaft 10. A gear drive 24, 25, 26 is connected with the shafts 22, 23 to transmit the adjustments of the main rudder shaft 11 in the same direction to an electromagnetic transmitter 27 which, in turn, through the cable n influences the motor b of the main rudder pointer f in the same direction, whereby, as described, the said pointer is adjusted in exact correspondence with the adjustments of the main rudder.

Having thus described our invention, what we claim is:

1. An indicating instrument for main and auxiliary ship rudders wherein the auxiliary rudder is mounted on the main rudder for movement therewith and rotatable independently thereof, comprising a main pointer for indicating the movements of the main rudder; an auxiliary pointer for indicating the movements of the auxiliary rudder; a scale associated with each pointer; main and auxiliary pointer shafts whereon the respective pointers are mounted, the auxiliary shaft being disposed at a point removed from the main shaft; connections whereby the auxiliary shaft travels bodily around the main shaft as a center and in synchronism therewith, electrical repeating means actuated by the main rudder and controlling the movement of the main pointer shaft and the synchronous movement of the auxiliary pointer shaft; electrical repeating means actuated in accordance with the rotary movements of the auxiliary rudder; means whereby the auxiliary pointer shaft may rotate on its own axis independently of its bodily movement; and connections whereby the second-named repeating means controls the rotation of the auxiliary shaft.

2. An indicating instrument for main and auxiliary ship rudders wherein the auxiliary rudder is mounted on the main rudder for movement therewith and rotatable independently thereof, comprising a main pointer for indicating the movements of the main rudder; an auxiliary pointer for indicating the movements of the auxiliary rudder; a scale associated with each pointer; main and auxiliary shafts whereon the respective pointers are fixed, the auxiliary shaft being disposed at a point removed from the main shaft; a sleeve rotatably mounted on the main pointer shaft; connections between the main and auxiliary pointer shafts for swinging the latter shaft bodily around the former shaft as a center and in synchronism therewith; a main repeater motor actuated by the main rudder and having its armature fixed to the main pointer shaft; an auxiliary repeater motor actuated in accordance with the rotary movements of the auxiliary rudder and fixed to the sleeve; and gearing between said sleeve and auxiliary pointer shaft to rotate the latter on its own axis independently of its bodily movement.

3. An indicating instrument, according to claim 1, in which the scale for the auxiliary pointer is situated on the tail of the main pointer.

In testimony whereof we affix our signatures.

WILLY FRENSDORFF.
HERMANN HEIN.